Patented June 10, 1941

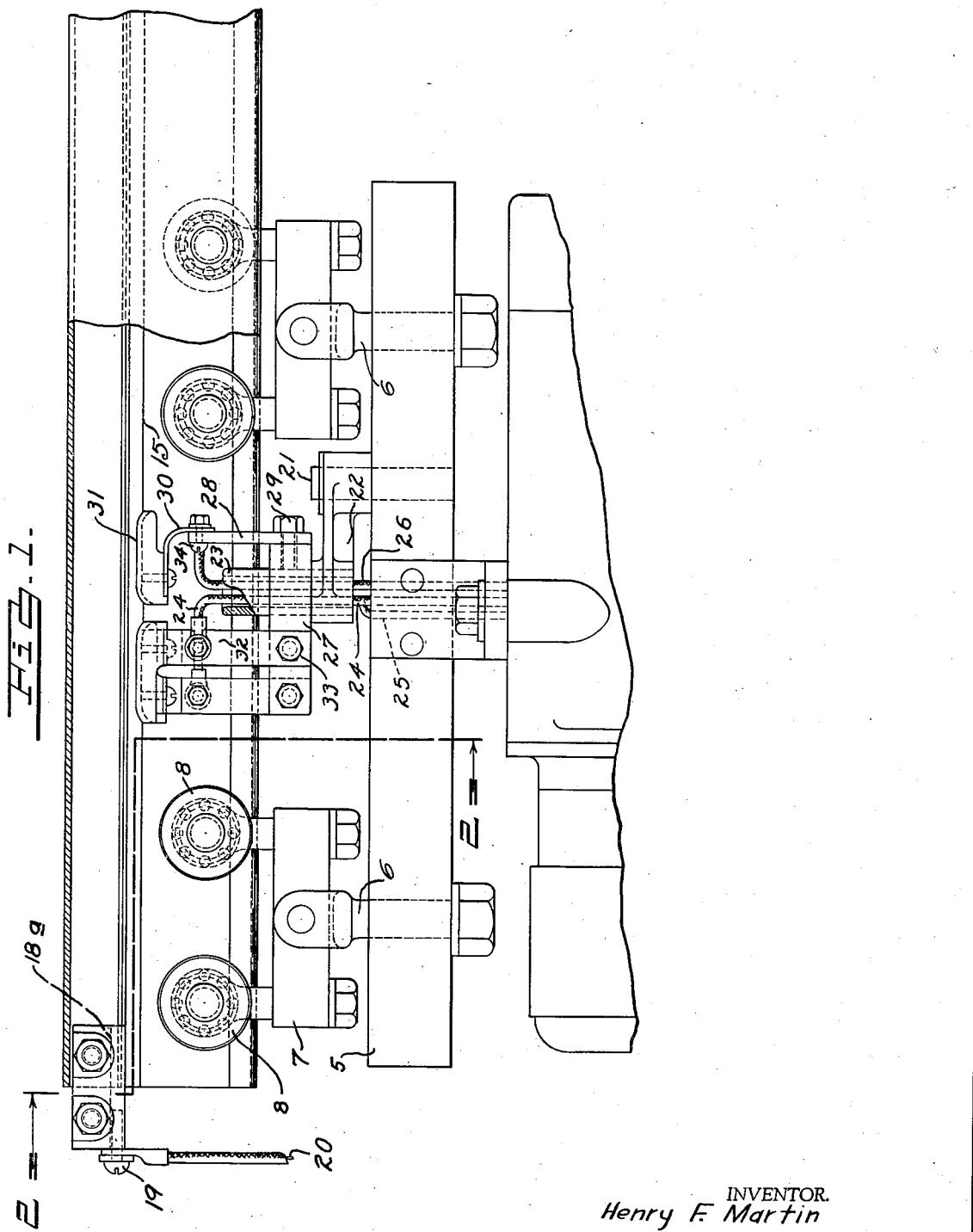

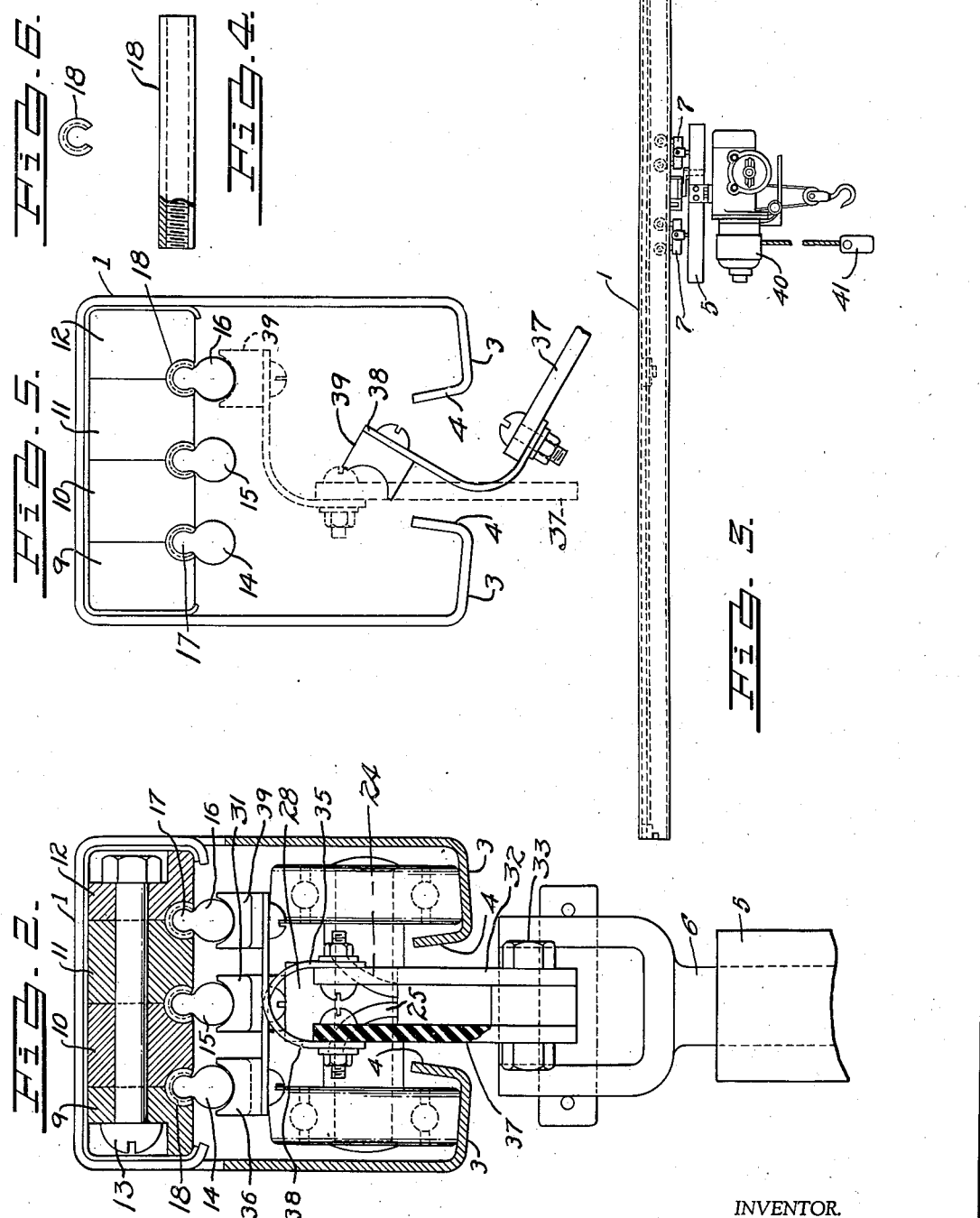

UNITED STATES PATENT OFFICE 2,245,135

SAFETY MONORAIL SYSTEM

Henry F. Martin, Detroit, Mich., assignor to Detroit Hoist and Machine Company, Detroit, Mich., a corporation of Michigan Application December 18, 1939, Serial No. 309,768

5 Claims. (Cl. 105—155)

This invention relates to trolley for electrical distribution systems and the object of the invention is to provide a distributing system for use in combination with an electric hoist for raising and conveying of materials including a hollow conduit in which the electric current conductors are enclosed and having a longitudinal slot through which an end of each of the current collectors projects.

Another object of the invention is to provide an electrical distribution system having a load-carrying unit capable of carrying heavy loads and provided with a current collector unit attached thereto and arranged to maintain continuous contact with the electric current conductors within the conduit.

A further object of the invention is to provide a distributing system including a current collector unit carried by the load-carrying unit and provided with current conductors which may be easily removed or replaced without removal of the collector unit or load-carrying unit.

Another object of the invention is to provide a distributing system having enclosed and self-contained electric current conductors which are easily removable in case of short circuits, grounds or defective insulators.

A further object of the invention is to provide a distributing system in which the electric current conductors are secured in place by means of insulators and tubular splice and feeder wire connectors which are secured together by assembly of the insulator to hold the current conductors in place.

These objects and the several novel features of the invention are hereinafter more fully described and claimed and the preferred form of construction by which these objects are attained is shown in the accompanying drawings in which—

Fig. 1 is a longitudinal section through the conduit showing the load-carrying unit and current collector unit assembled therewith.

Fig. 2 is a section taken on line 2—2 of Fig. 1 showing the current collector unit, supporting insulators, and method of supporting the insulators and collector shoes.

Fig. 3 is an elongated view of the conduit in combination with the load-carrying unit and hoist.

Fig. 4 is a detail of the connector and connector bar splice.

Fig. 5 is a semi-diagrammatic view of the end of the rail showing the method of replacing the collector brushes.

Fig. 6 is an end view of the connector shown in Fig. 4.

The conduit providing a trolley track is shown in cross section in Fig. 2 and comprises a conduit 1 closed on both sides of the top and having in- turned flanges 3 at the bottom provided with upwardly turned edges 4 and forming a space between these edges through which the hoist supports extend. The load-carrying unit 5 is shown more particularly in Figs. 1 and 3 and is connected by means of bolts 6 to the carriage 7 which is supported on the rollers 8 riding in the conduit channels 3. The load-carrying unit 5 is shown as carrying a hoist but may carry other types of electrically operated mechanisms as desired. The conduit 1 is made up, in actual practice, in ten foot lengths and at each end and in the center is provided with insulated supports for the electric current conductors. These supports comprise the insulators 9, 10, 11 and 12 which are connected together by a bolt 13.

The electric current conductors 14, 15 and 16 are shaped in cross section as shown and are each provided with an upper portion 17 for securing the current conductors in the conduit. The electric current conductors are each five feet long to extend between the insulators which are spaced at five foot intervals along the ten foot monorail section. Where the current conductors extend through the insulators, they are held in position by a connector 18 which is C-shaped in cross section as shown in Figs. 2 and 6 so that the abutting ends of the five foot lengths of the current conductors are inserted with the portions 17 fitting within the connectors 18 and at this time by tightening up the bolts 13 as will be understood from Figs. 1 and 2, the connectors and conductors are clamped firmly in the insulators and are spaced by this arrangement from the conduit in all directions. The terminal connector 18a shown in Fig. 1 is the same as that shown in Figs. 4 and 6 and this connector is threaded on the inside to receive the terminal connecting screw 19 to which the current supply wire 20 is connected.

The load-carrying unit, as shown in Fig. 1, is provided with a pin 21 extending upwardly therefrom on which a drag link 22 is pivotally mounted. This drag link is provided at the end with a tube 23 pivotally mounted therein and through this tube the insulated current conductors 24, 25 and 26 extend. The pivot tube 23 is fixedly mounted in the block 27 of the current collector unit and at the forward end a stiff insulator strip 28 is secured to the member 27 by the screw 29 and at the upper end a metal leaf spring 30 is connected to the insulator strip 28 and supports a current collector shoe 31 in contact with the current conductor 15.

The wire 26 is connected to the spring metal arm 30 by means of the screw 34 on the top of the stiff insulator strip 28. An insulating strip 32 is secured to one side of the member 27 by the screw 33 as shown in Figs. 1 and 2 and a spring arm 35 is connected to the upper end of this member and supports a current collector shoe 36 in contact with the current conductor 14. This arm 35 is connected to the insulated wire 24 as shown in Fig. 1. A stiff insulating arm 37 is secured to the opposite side of the member 27 and is provided with a spring arm 38 connected to the wire 25 shown in Fig. 1 and supporting a shoe 39 which rides in contact with the current conductor 16. These leaf springs 30, 35 and 38 support the current collector shoes in firm contact with the current conductors 14, 15 and 16 and by means of the wires 24, 25 and 26 the current is carried to the hoist or other electrically operated mechanism carried by the load-carrying unit. This provides a three wire system for operating the electric motor 40 shown in Fig. 3 and a switch 41 is provided for turning the electric motor 40 on or off. One of the particular advantages of this construction is that any one of the stiff insulating strips may be disconnected from the member 27 by removing its supporting screw, at which time, the insulating strip, spring arm and current collector shoe may be removed as a unit While not here shown, sufficient surplus wire 24, 25 and 26 is provided to allow the shoe to be removed as shown in Fig. 5 to a point where the respective wire may be disconnected from its arm and this arrangement allows removal, repair or replacement of the shoes and supporting arms at any time without the hands coming into close proximity to the current conductors 14, 15 and 16.

It will also be noted that the current collector unit is so designed that copper dust due to constant rubbing cannot accumulate where it would produce electrical paths to short circuit or ground the current conductors.

From the foregoing description it becomes evident that the device is very simple and efficient in operation, will allow ready removal and replacement of the shoes and supporting arms, provides a device which may be readily assembled and repaired and provides a device which accomplishes the objects described.

Having thus fully described my invention, its utility and mode of operation, what I claim and desire to secure by Letters Patent of the United States is—

1. A trolley for use in conjunction with a hollow conduit having a longitudinal slot in its lower side providing rails on opposite sides of the slot and having parallel electrical conductors secured therein above the slot, comprising a frame, trolley wheels carried thereby and riding the rails, current collectors including shoes each having a form to engage an electrical conductor and an L-shaped arm for each shoe having an end projecting through the slot to below the conduit, and means associated with the trolley frame beneath the slot for attaching an end of each shoe arm thereto and permitting detachment of the current collectors at a point exteriorly of the conduit and ready removal from the conduit through said slot.

2. A trolley for use in conjunction with a hollow conduit having a longitudinal slot in its lower side providing rails on opposite sides of the slot and having parallel electrical conductors secured therein above the slot, comprising a frame, trolley wheels carried thereby and riding the rails, current collectors including shoes each having a form to engage an electrical conductor and an L-shaped arm for each shoe having an end projecting through the slot to below the conduit, means pivotally associated with the trolley frame beneath the conduit to which an end of each shoe arm is attached, said pivot point being forward of the point of attachment of the shoe arm in respect to the direction of movement of the trolley frame.

3. A trolley for use in conjunction with a hollow conduit having a longitudinal slot in its lower side providing rails on opposite sides of the slot and having parallel electrical conductors secured therein above the slot, comprising a frame, a pair of trolley wheels near one end of the frame and a second pair of trolley wheels disposed toward the other end of the frame, said pairs of trolley wheels riding the said rails, means pivotally associated with the trolley frame between said pairs of wheels to which an end of each of the shoe arms is detachably secured, the pivot point of said means being forward of the point of connection of the arms in the direction of movement of the frame and providing a construction in which the current collectors may be detached at a point exteriorly of the conduit.

4. A trolley for use in conjunction with a hollow conduit having a slot in its lower side providing rails on opposite sides of the slot and having a plurality of parallel electrical conductors secured therein above the slot, comprising a frame, two pairs of trolley wheels at the forward and two pairs of trolley wheels at the rear end of the frame, each of said wheels riding the rails, a plurality of current collectors each including a shoe having a form to engage an electrical conductor, an arm for each shoe projecting through the slot to below the conduit, a frame below the conduit to which the projecting ends of the conductor arms are detachably secured, and means for pivotally supporting the conductor arm frame relative to the trolley frame to compensate for variation in position of the shoes laterally of the conduit, the shoe arms being detachable from the supporting frame and removable through the slot of the conduit substantially as shown and described.

5. A trolley for use in conjunction with a hollow conduit having a slot in its lower side providing rails on opposite sides of the slot and having a plurality of parallel electrical conductors secured therein above the slot, comprising a frame, two pairs of trolley wheels at the forward and two pairs of trolley wheels at the rear end of the frame, each of said wheels riding the rails, a plurality of current collectors each including a shoe having a form to engage an electrical conductor, an arm for each shoe projecting through the slot to below the conduit, a frame below the conduit to which the projecting ends of the conductor arms are detachably secured, a tube secured to the conductor arm frame through which wires connected with the shoes pass to an electrically controlled apparatus supported by the trolley frame, an arm extending from the said tube to one side thereof, a pin on the trolley frame on which the said tube and conductor arm frame are pivotally supported to compensate for variation in position of the shoes laterally of the conduit, the shoe arms being detachable from the supporting frame and removable through the slot of the conduit substantially as shown and described.

HENRY F. MARTIN.